United States Patent
Haglin et al.

(10) Patent No.: US 10,627,359 B2
(45) Date of Patent: Apr. 21, 2020

(54) SENSOR PLATFORM INCLUDING THERMAL CONDUCTIVITY SENSOR FOR ANALYZING THE CONTENTS AND SURROUNDINGS OF SEALED PACKAGES OR INSULATED GLASS UNITS

(71) Applicant: FDR Design, Inc., Buffalo, MN (US)

(72) Inventors: Dan Haglin, Howard Lake, MN (US); Randi Ernst, Hawkins, TX (US)

(73) Assignee: FDR Design, Inc.

( * ) Notice: Subject to any disclaimer, the term of this patent is extended or adjusted under 35 U.S.C. 154(b) by 306 days.

(21) Appl. No.: 15/782,694

(22) Filed: Oct. 12, 2017

(65) Prior Publication Data

US 2018/0100823 A1    Apr. 12, 2018

Related U.S. Application Data

(60) Provisional application No. 62/407,236, filed on Oct. 12, 2016.

(51) Int. Cl.
*G01N 27/18* (2006.01)
*G01N 25/18* (2006.01)

(52) U.S. Cl.
CPC ............. *G01N 27/18* (2013.01); *G01N 25/18* (2013.01)

(58) Field of Classification Search
CPC ............................... G01N 27/18; G01N 25/18
See application file for complete search history.

(56) References Cited

U.S. PATENT DOCUMENTS

| 4,886,095 | A | 12/1989 | Lisec |
| 6,550,961 | B1 * | 4/2003 | Ueda ...................... G01N 27/18 374/44 |
| 2003/0227663 | A1 | 12/2003 | Agrawal et al. |
| 2007/0044540 | A1 | 3/2007 | Ohkubo et al. |
| 2008/0245131 | A1 | 10/2008 | Tornkivst et al. |
| 2011/0107816 | A1 | 5/2011 | Barth |
| 2011/0148218 | A1 | 6/2011 | Rozbicki |
| 2014/0097636 | A1 | 4/2014 | Snider et al. |
| 2014/0350870 | A1 | 11/2014 | Sagberg |
| 2016/0018365 | A1 | 1/2016 | Agah et al. |

FOREIGN PATENT DOCUMENTS

WO      2015154688 A1    10/2015

OTHER PUBLICATIONS

The International Search Report and Written Opinion rendered by the International Searching Authority for PCT/US17/056395, dated Jan. 5, 2018, 10 pages.

* cited by examiner

*Primary Examiner* — David Z Huang
(74) *Attorney, Agent, or Firm* — Skaar Ulbrich Macari, P.A,

(57) ABSTRACT

A sensor system for sensing environmental conditions inside of a sealed enclosure includes a microcontroller and a thermal conductivity sensor for sensing inert gas concentration. The thermal conductivity sensor is operably coupled to the microcontroller. The thermal conductivity sensor includes a lamp with a filament that is exposed to the environment inside of the sealed enclosure, a thermal mass and a temperature sensor coupled to the thermal mass. The lamp is disposed at least partially within the thermal mass. A heater is coupled to the thermal mass.

18 Claims, 15 Drawing Sheets

UVA (365±10) 0.93counts/uW/cm2, UVB (330 ±10) 2.1counts/uW/cm2, 16b,-40°C~85°C,
VEML6075 uses 0x10 slave address for 7-bit I2C addressing protocol

SENSOR PLATFORM INCLUDING THERMAL CONDUCTIVITY SENSOR FOR ANALYZING THE CONTENTS AND SURROUNDINGS OF SEALED PACKAGES OR INSULATED GLASS UNITS

PRIORITY

This application claims priority to and the benefit of U.S. Provisional Patent Application No. 62/407,236, filed Oct. 12, 2016, which is incorporated fully herein by reference.

FIELD

The present invention generally relates to electronic sensors, and more particularly to electronic sensors for measuring parameters of gas inside of an enclosure.

BACKGROUND

It is common in applications, such as in insulated glass units (IGUs), to evacuate a sealed enclosed space and fill that space with an inert gas, such as argon. Knowing the conditions within the sealed enclosure are important for a number of reasons, including certification, research and development, warranty, code creation and implementation, material evaluation, and test method evaluation. Thus, conditions within the sealed enclosure must be measured.

A typical method of performing a measurement is to withdraw a sample of the gas from the enclosure and measure the sample to determine the percentage of inert gas present. However, the conventional methods for performing such measurements have notable deficiencies. For example:

1) Raman laser spectroscopy: measures oxygen only;
2) Spark Gap using differences in gap distance an electrical spark can jump: readings can be affected by glass thickness and/or metallic coatings. It also requires operator interpretation;
3) Laser or bulb frequency shift, Zeeman effect: measures oxygen only. Readings are further compromised by ambient oxygen on the outside of the sealed unit;
4) Penetrate gas sampling using oxygen analyzers or gas chromatography: oxygen analyzers, employed by themselves, can very accurately measure oxygen, but if an inert gas and oxygen mixture must be analyzed, then one would have to utilize extrapolation to calculate the fill gas only using the concentration of oxygen in the sample. The extrapolation requires the oxygen and nitrogen in the sample gas being measured to be in the same ratio as what is found in the calibration gas, typically room air ($O_2$=20.95%, $N_2$=78.09%). If the oxygen/nitrogen ratio in a sealed package, container or IGU becomes skewed by outside factors (desiccant adsorption, differential permeability, etc.) then oxygen analysis extrapolation becomes grossly inaccurate;
5) Metal "sensor" placed in sealed cavity that changes color in presence of oxygen: measures oxygen only;
6) Optical fluorescence: small sensor "dots" placed in cavity to measure oxygen (MOCON OpTech and others) measures oxygen only. Sensors can be affected by UV;
7) Guarded hotplates that measure the thermal energy transfer from one glass surface to another: bulky to use and slow to acquire steady-state conditions;
8) Battery powered temperature and pressure data loggers: batteries may die or leak;
9) Spark Emission Spectroscopy (SES) analyses of the light spectra from a high voltage spark inside a sealed insulating glass cavity: these have manufacturer stated inaccuracies as high as ±5% at concentration levels below 85%. Readings are dependent on oxygen and nitrogen to be in the same ratio as that found in ambient air;
10) Gas chromatographs (GC): can be cumbersome to use and extracting a quality sample from an IGU using a syringe is difficult and requires a skilled operator to perform. This type of gas sampling is prone to introduce contamination into the test sample which will result in low reliability, repeatability, and accuracy. This type of testing also compromises the seal integrity of the package, container, or IGU; and
11) Thermal conductivity sensors arranged in a Wheatstone bridge: requires precisely matched resistive filaments and offset resistors. Wheatstone bridge circuits require one out of the two resistive filaments to be in a stream of reference gas. Thus, measuring the thermal conductivity of a gas in a sealed container is not possible using a Wheatstone bridge configuration.

Moreover, invasive measurement techniques compromise the integrity of the enclosure. Withdrawing a sample from an enclosure is not only difficult to do, but the potential for error and contamination of the sample is probable since the sample is transferred from the sealed cavity to the analysis instrument.

In addition, many types of sensors are inherently bulky and/or require wired power and communication lines that prevent the enclosure from being formed with internal sensor packages.

Thus, there is a need for improved devices, systems and methods to measure the conditions within a sealed enclosure.

SUMMARY

A sensor system includes one or more sensors, including thermal conductivity, temperature, pressure, relative humidity, oxygen concentration, ultraviolet, sound and light. The sensor system is disposed within a sealed enclosure. The sensor system is powered wirelessly, such as via inductive power transfer. The sensor system also uses wireless communications protocol(s), such as Bluetooth and infrared (IR) pulses, to wirelessly communicate data to the outside world.

The system can be wirelessly powered by an inductive coil, battery and/or photovoltaics. Thus, there is no need to have any physical wires extending outward through the sealed enclosure.

The disclosure includes a sensor system for sensing environmental conditions inside of a sealed enclosure, including a microcontroller and a thermal conductivity sensor for sensing inert gas concentration. The thermal conductivity sensor is operably coupled to the microcontroller. The thermal conductivity sensor includes a lamp with a filament that is exposed to the environment inside of the sealed enclosure, a thermal mass and a temperature sensor coupled to the thermal mass. The lamp is disposed at least partially within the thermal mass. A heater is coupled to the thermal mass.

The lamp can be an incandescent type and the filament is exposed to the environment via an aperture defined in a glass enclosure of the lamp. The thermal mass can comprise an aluminum block which defines a cavity where the lamp is located. A layer of insulation can be provided to the thermal mass. The heater can comprise a plurality of resistors thermally coupled to the thermal mass. The thermal conductivity sensor can be operably coupled to the microcontroller via an analog to digital converter.

The sensor system can also include one or more of the following sensors, which are each operably coupled to the microcontroller: a relative humidity sensor; a temperature sensor; an oxygen sensor; an acoustic sensor; an ambient light sensor; a pressure sensor; and an ultraviolet sensor.

Sensor data can be stored in a memory coupled to the microcontroller. A non-transitory memory such as an EEPROM can be used for this purpose.

A wireless communication means such as a Bluetooth chip can be operably coupled to the microcontroller to permit two-way communications with a computing device located external to the sealed container in which the sensor system is located.

The disclosure also includes an insulated glass unit (IGU). The IGU includes a front glass plate, a back glass plate spaced apart from the front glass plate and oriented parallel to the front glass plate, a frame surrounding a perimeter of the front and back glass plates, which defines an enclosed space, and a sensor system disposed entirely within the enclosed space. The sensor system can be configured in accordance with this disclosure The disclosure further includes a method of monitoring an environment inside of a sealed container, including an inert gas concentration. A sensor system is disposed completely within the sealed container. The sensor system is wirelessly powered. An aperture is formed in a lamp to expose a filament of the lamp to the environment inside of the sealed container. The lamp is disposed at least partially within a thermal mass. The thermal mass is heated to a temperature above a temperature of the environment inside of the sealed container. A first voltage divider circuit that includes the lamp is formed. A second voltage divider circuit that is a reference voltage divider circuit is formed. A differential voltage utilizing the first and second voltage divider circuits is determined. The inert gas concentration is determined from the differential voltage.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
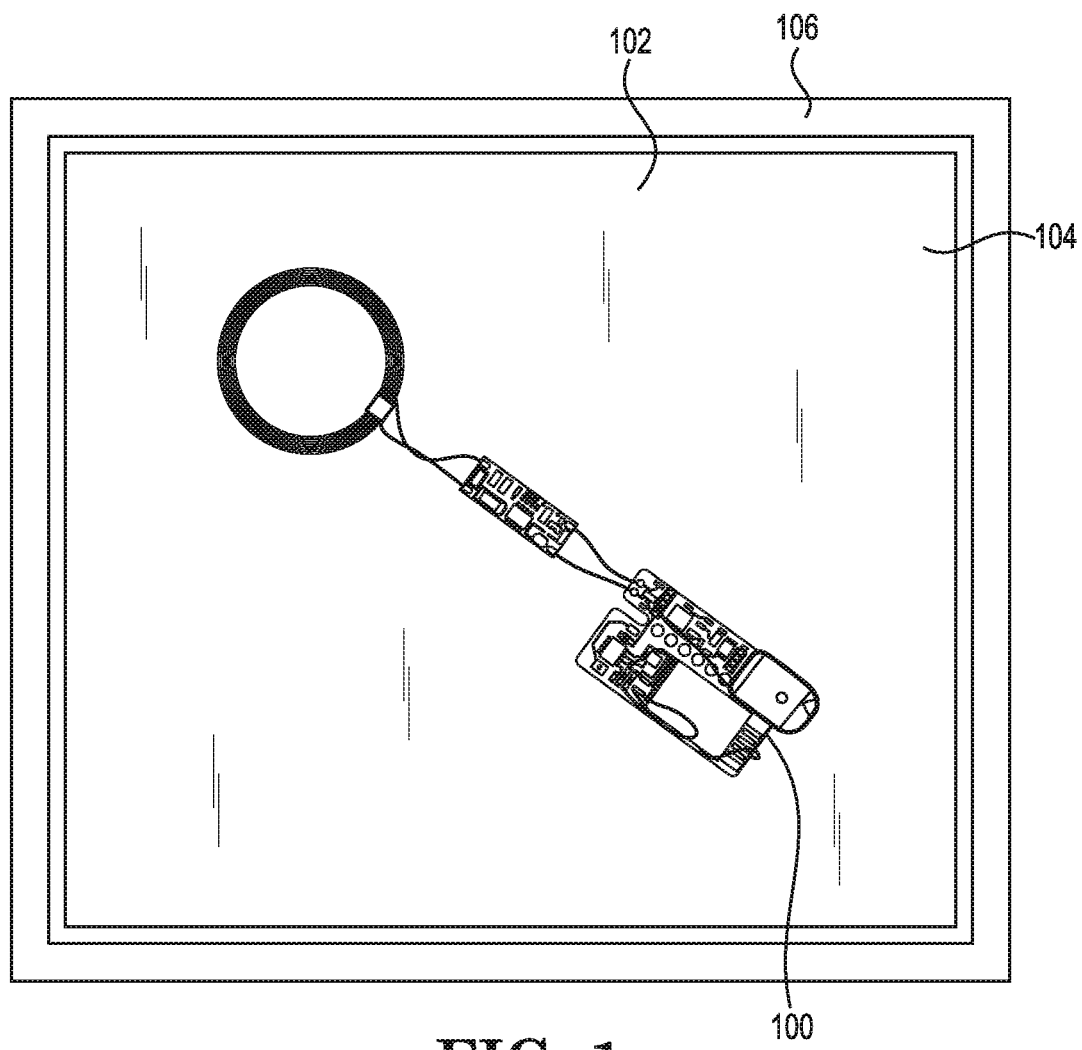
FIG. 1 is an image of a sensor system disposed within a sealed enclosure according to certain embodiments.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

In the following descriptions, the present invention will be explained with reference to example embodiments thereof. However, these embodiments are not intended to limit the present invention to any specific example, embodiment, environment, applications or particular implementations described in these embodiments. Therefore, description of these embodiments is only for purpose of illustration rather than to limit the present invention.

The sensor system, platform and methods disclosed herein allow multiple sensor devices to be placed in-situ in a sealed enclosure (such as an IGU) and wirelessly communicate data to the outside world via Bluetooth, IR pulses or other wireless methodology.

Referring to FIG. 1, the sensor system 100 is shown disposed completely within an IGU 102. Of course, the sensor could be disposed within any type of sealed container, but this disclosure will reference an IGU as an example of such container. The enclosure 102 can be any size, shape or proportion.

The IGU comprises front and back glass plates (each 104) spaced apart with a frame 106 disposed around the edges of the plates 104 to define an enclosure. A gasket or other sealing material at the plate/frame interface allows the enclosed space to be evacuated and an inert gas such as argon to be placed within and maintained in the enclosure. The sensor system 100 is placed within the enclosure prior to sealing of the enclosure.

Power for the sensor system can be provided wirelessly via an induction coil or other wireless means as discussed herein. A battery can also be included to allow the system to operate for a time without the need to be connected to a power supply. A solar cell can also be coupled to a battery.

Figure 2:
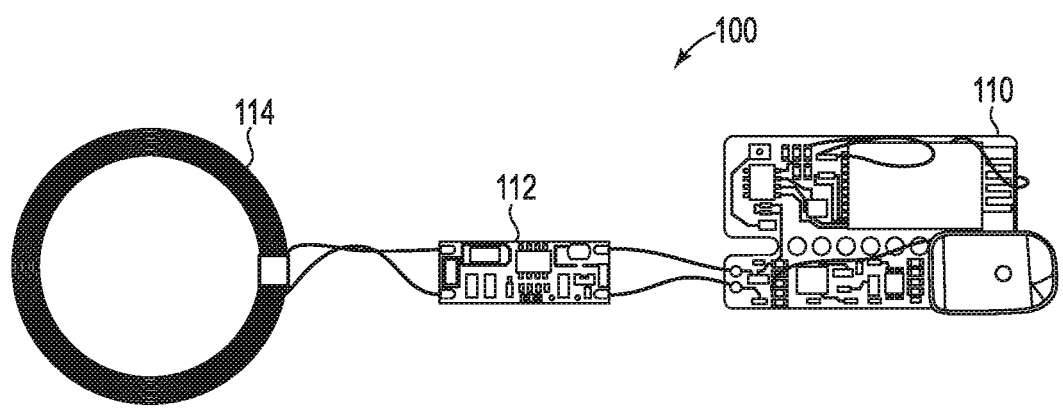
FIGS. 2-3 are images of a sensor system according to certain embodiments.
Figure 3:
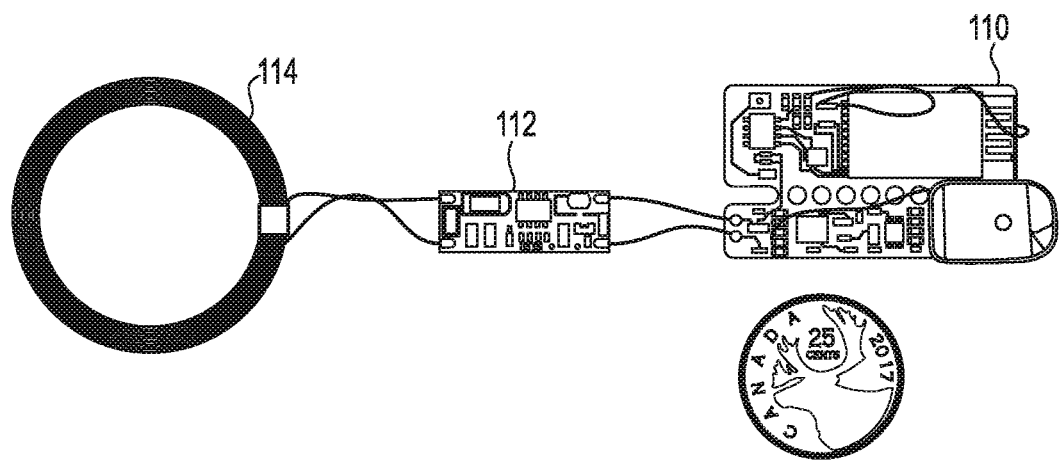

Referring next to FIGS. 2-3, main components of the sensor system 100 will be discussed. A main circuit board 110 includes the processor (microprocessor or microcontroller) and sensor components. A power board 112 is electrically connected to the main board 110. An inductive coil 114 is electrically connected to the power board 112.

The inductive coil allows an electrical current to be induced by an external charging component, which then causes current to flow to the power board 112 via its wired connection to the coils. The power board 112 transforms the current into the proper voltage required for the electronic components on the main board 110. The power board 112 and main board 110 could also be integrated as a single board.

In alternative embodiments, the sensor system 100 can be powered by photovoltaics (e.g. solar cells) instead of the inductive coil. A small battery could also be provided in still further embodiments.

The wireless features allow the sensor system to reside within the sealed enclosure without any external connection wires to compromise the sealed cavity. The sealant spacer glass bond in an IGU application is not altered in any way by the presence of the present sensor system. There need not be batteries, so the sensor system can lay dormant for days/months/years and then be activated for precise data readings.

As can be seen in FIG. 3 where a Canadian quarter is placed for relative size perspective, the system has a small overall size such that it can fit in a typical sealed insulating glass cavity, such as an IGU.

Figure 8:
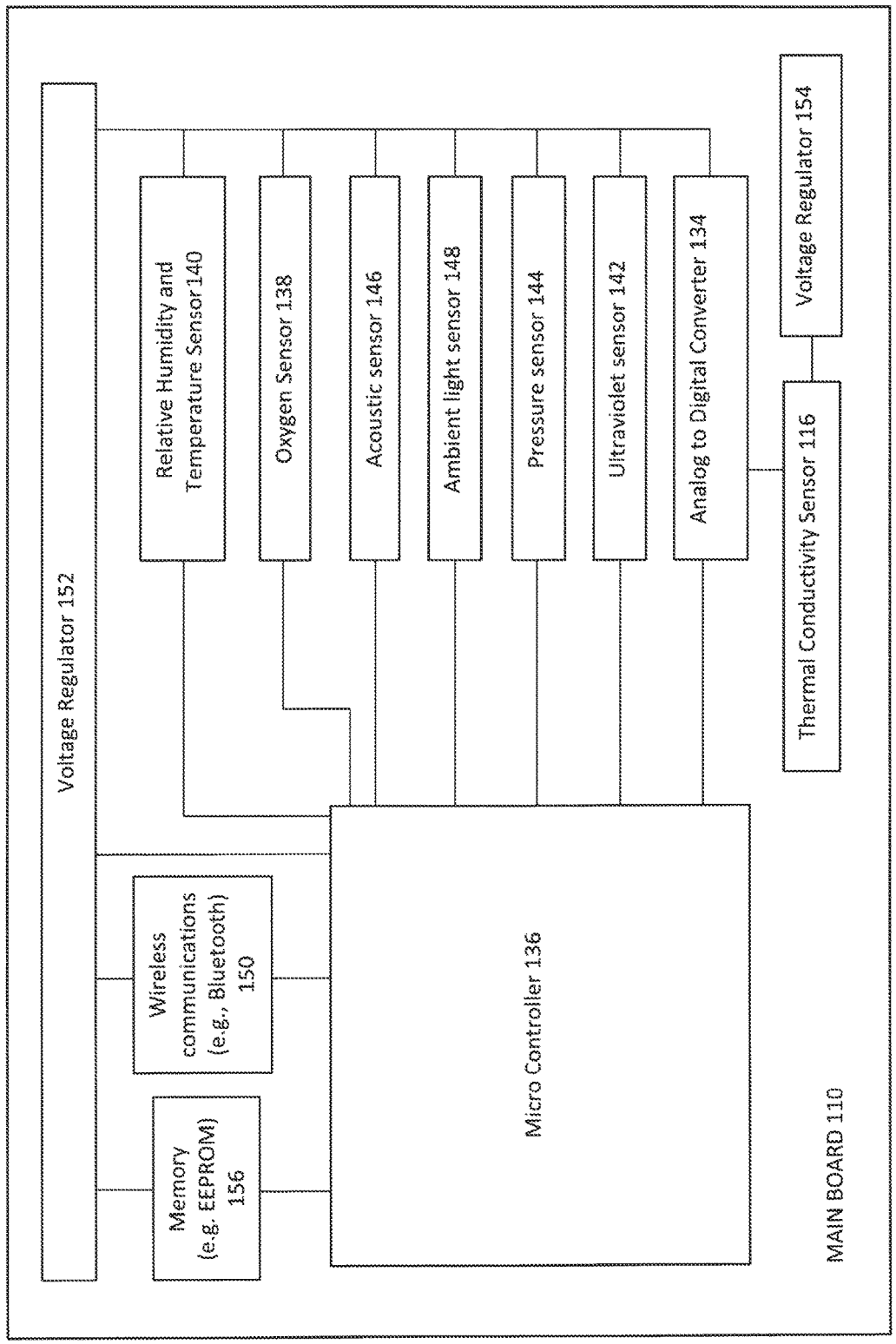
FIG. 8 is a block diagram of a main board for a sensor system according to certain embodiments.

The sensor system 100 can be configured to include a multitude of sensors. Various embodiments of the sensor system can be configured by combining any one or more of the following sensor systems. All of the sensor components can be mounted on one circuit board, or on multiple circuit boards. FIG. 8 is a block diagram for an example embodiment where each of the circuit components discussed herein are all provided to a main circuit board.

A Thermal Conductivity Detector (TCD) sensor 116 is a primary sensor for the system 100 since the inert gas concentration (e.g. argon, krypton, xenon, etc.) in the sealed enclosure is a particular data if interest to be collected for an IGU since it relates to thermal performance. The inside of the sealed enclosure is its own mini biosphere or environment with conditions that are no longer the same as the environment external to the enclosure 102. Note that desiccant can be placed inside of the enclosure before sealing to super dry the inside of the enclosure such that the relative humidity percentage is very low.

Different materials may be present in the sealed enclosure that may off-gas, thus creating a higher concentration than seen typically in the surrounding atmosphere. The gas inside of the enclosure can also be altered by the desiccant. Pressures and stresses will occur at varying levels depending on the construction dimensions of the sealed enclosure as well. However, the TCD sensor does not care what the actual mix of gasses is because it calculates a net thermal conductivity of the totality of gases present. Knowing the gas concentration in the cavity is important for energy performance standards as well as a tool to evaluate different sealant spacer configurations and different lots of sealant.

Referring to FIGS. 2-7, in one embodiment, the TCD sensor 116 includes a T1.25, 14 volt, C-2F incandescent lamp 118 (although others may be used), which is modified so the filament is no longer sealed inside the glass bulb. The filament can be exposed by means of penetrating the glass bulb using methods such as cutting, mechanical drilling, grinding, breaking, laser drilling, etc. to form an aperture or hole 120 through the glass enclosure of the bulb. The internal filament should not be disturbed or damaged when forming the aperture 120.

Figure 4:
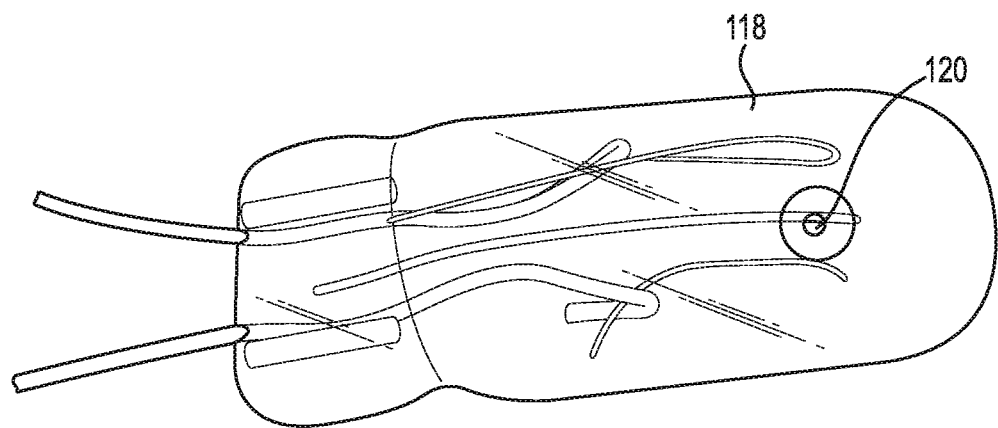
FIG. 4 is an image of a modified incandescent bulb for the thermal conductivity detector according to certain embodiments.
Figure 5:
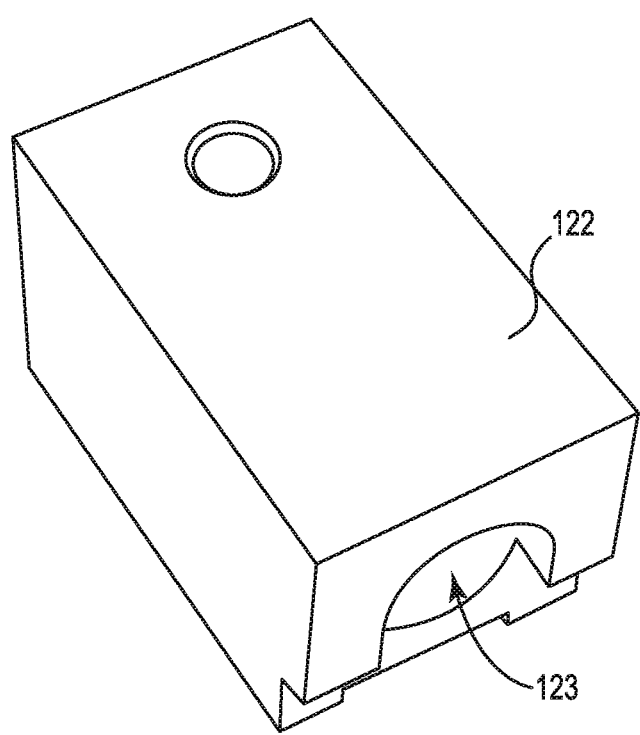
FIG. 5 is an image of an aluminum block for the thermal conductivity detector according to certain embodiments.
Figure 6:
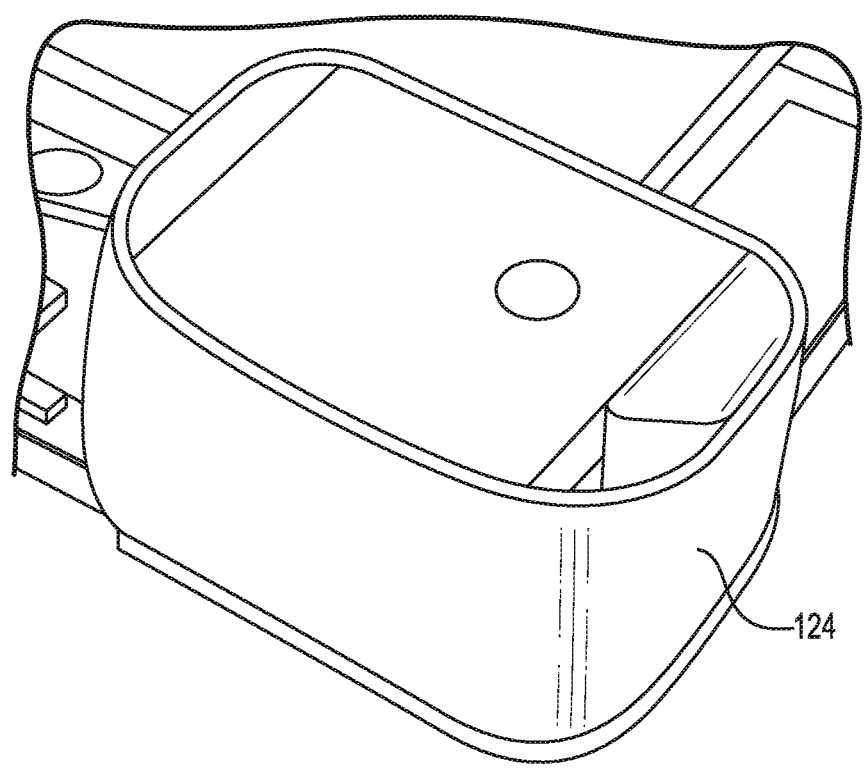
FIG. 6 is an image of an insulated thermal block for the thermal conductivity detector according to certain embodiments.

The resulting "exposed filament modified glass bulb" which can be seen in FIG. 4, can then be inserted, at least partially, into a cavity 123 of an aluminum, brass, plastic or other thermal mass or block of material, such as the aluminum block 122 in FIG. 5, to provide greater thermal mass and temperature stability. The block can then be covered with an insulation 124 of foam, felt, plastic, tape, etc., as shown in FIG. 6, to insulate the filament and/or block from external temperature influences. The block can be disposed on the main board 110 as shown in FIGS. 2-3, or it can be electrically coupled to the main board.

Figure 7:
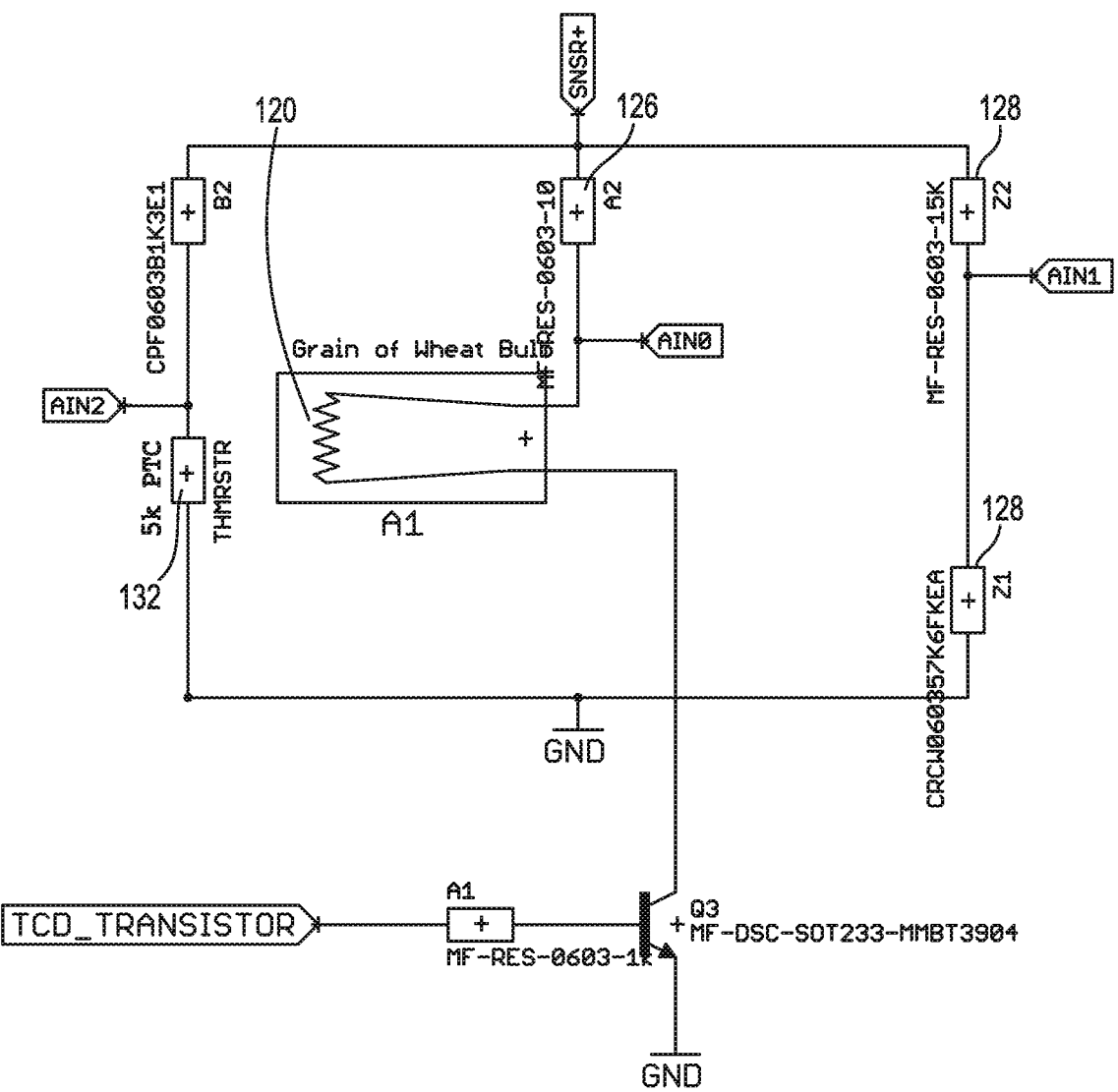
FIG. 7 is an electrical component schematic for a thermal conductivity sensor for a sensor system according to certain embodiments.

Referring to Circuit diagram of FIG. 7 specifically, the thermal conductivity element (such as bulb 120) is arranged in a series circuit along with one or more fixed resistors 126 to form a voltage divider. An additional reference voltage divider circuit is formed using two or more fixed resistors 128 in series. A regulated excitation voltage is temporarily applied across both voltage divider circuits.

Figure 16:
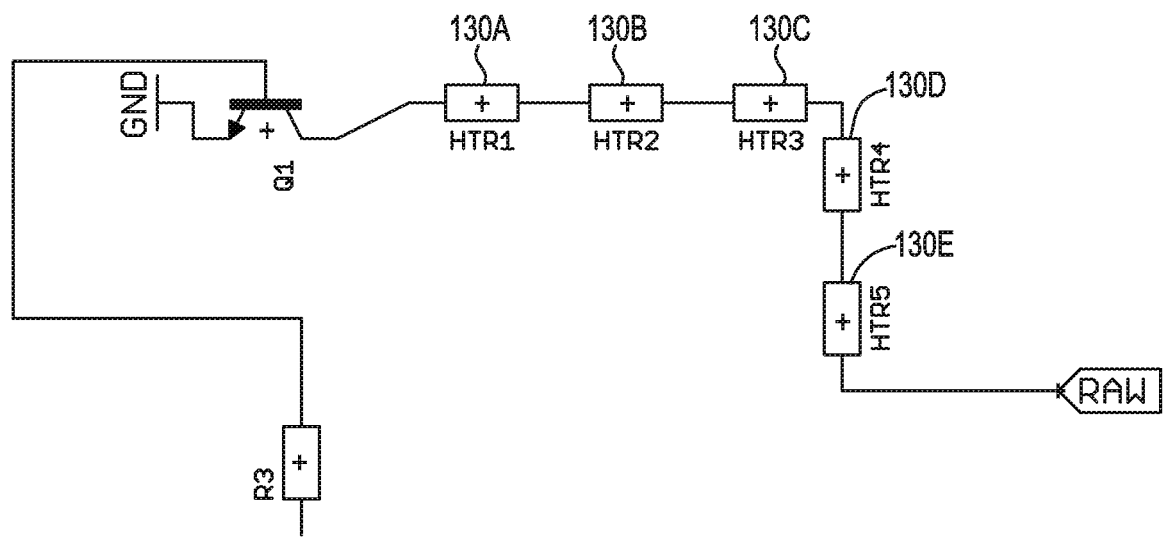
FIG. 16 is an electrical schematic for a resistive heater according to certain embodiments.

In operation, the block 122 is heated by means of a plurality of resistive element heaters 130A-130E (shown in FIG. 16), monitored by a temperature sensor (thermistor 132 in FIG. 7), and regulated with a proportional-integral-derivative (PID) controller algorithm to a predetermined temperature above ambient.

When the excitation voltage is first applied to the bulb 120 filament, the filament has a low resistance, and a low voltage is measured at the differential amplifier. As the filament warms up, it's resistance will increase, and a higher voltage is measured at the differential amplifier. If the excitation voltage is applied for too short of a time, the voltage rise won't be repeatable. If the excitation voltage is applied for too long of a time, the voltage rise will cause self-heating and a long delay before another reading can be performed. The optimal excitation time is safely after the knee voltage becomes more linear and the measured voltage becomes repeatable.

Figure 15:
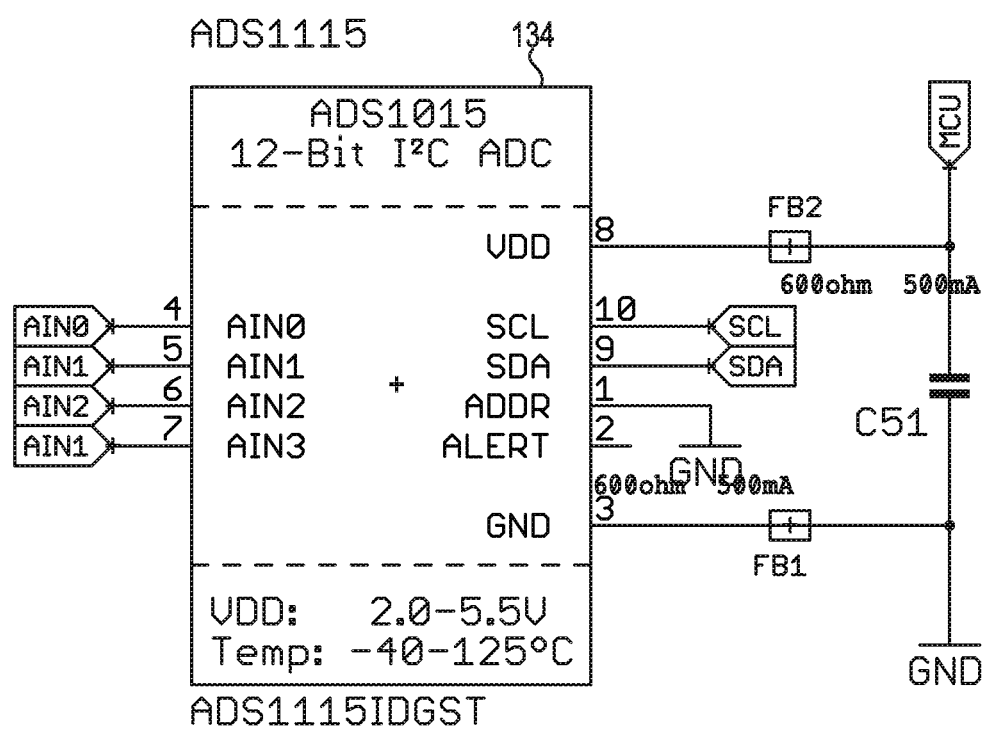
FIG. 15 is an electrical schematic for an analog to digital converter according to certain embodiments.
Figure 17:
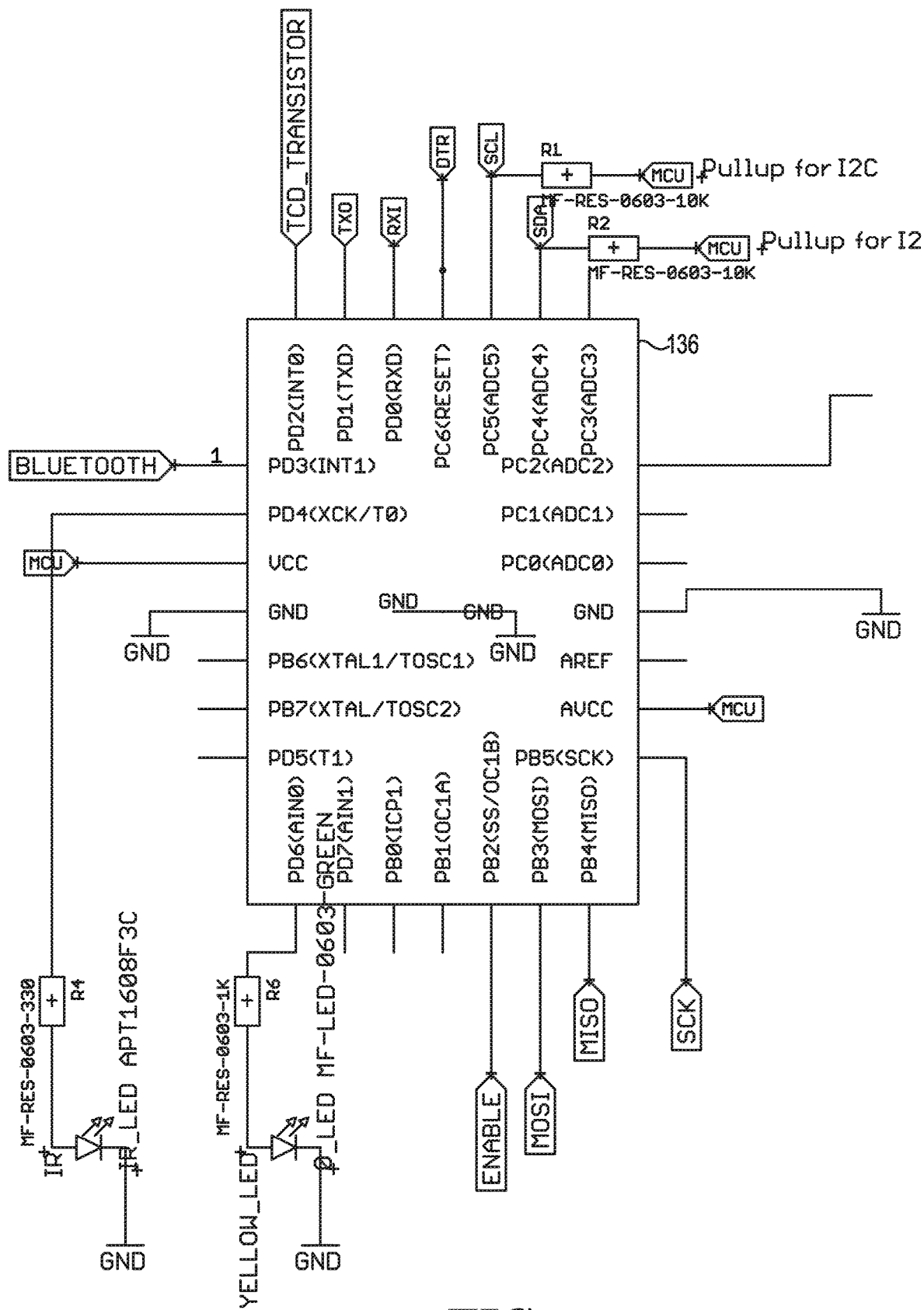
FIG. 17 is an electrical schematic for a microcontroller according to certain embodiments.

After the optimal excitation time has elapsed, an analog-to-digital converter (ADC) 134 (shown in FIG. 15) is used to measure the differential voltage between the two voltage dividers. The differential voltage is multiplied by an amplifier and the amplified difference is analyzed by a microcontroller 136 (shown in FIG. 17).

The excitation voltage will turn off and remain off until another reading is requested. Turning the regulated voltage on and off prevents the thermal conductivity element from self-heating. Since there is no lingering self-heating from the filament and the filament is allowed to return to the stable PID controlled temperature before another reading is performed, the calibration is extremely linear.

The TCD sensor 116 is thus able to measure argon concentrations between 0% and 100%. In contrast, spark emission type sensors cannot reliably read argon concentrations below 50%. In addition, the TCD sensor disclosed herein has been found to have less than a ±½% error.

An oxygen sensor 138 (see FIG. 8) can be provided to the system to measure the amount of oxygen in the cavity of the IGU. This may be desired because some compounds or polymers require a minimum concentration of oxygen. When combined with the TCD sensor 116, oxygen concentration also allows one to deduce the presence of other gasses such as krypton or xenon. The oxygen sensor 138 can be disposed on the main board 110 as shown in FIG. 8.

Figure 11:
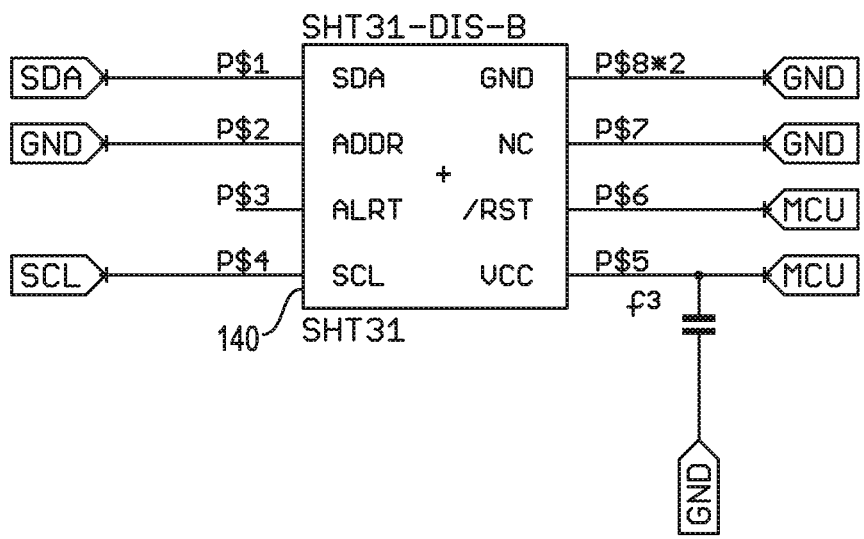
FIG. 11 is an electrical schematic for a humidity and temperature sensor according to certain embodiments.

A Relative Humidity (RH) sensor 140 can also be provided. The main role of desiccant is to remove water vapor from inside of the sealed cavity. Knowing the present RH will assure the user that the desiccant is functioning and not saturated. Building sealed units without desiccant or units with a very small known amount of desiccant, the RH sensor 140 (shown in FIG. 11) can evaluate sealant spacer materials and their ability to block water vapor transfer into the sealed unit. The RH sensor can be disposed on the main board 110 as shown in FIG. 8.

A temperature sensor (also noted as reference 140) can further be provided along with the RH sensor as an integrated component. Precise temperature measurement can be useful for monitoring off-gassing from desiccant or other materials at different temperature ranges. A temperature sensor 140 is also useful for general temperature logging. The temperature sensor can be a function of the RH sensor 140 and disposed on the main board 110 as shown in FIG. 8. Alternatively, the temperature sensor can be a separate component from the RH sensor.

Figure 12:
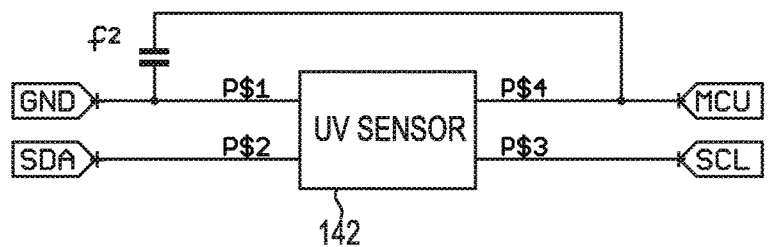
FIG. 12 is an electrical schematic for an ultraviolet (UV) sensor according to certain embodiments.

An ultraviolet (UV) sensor 142 can be provided to the system 100. Knowing the amount of UV reaching into the sealed enclosure is important when trying to understand the longevity of any organic material (sealants for example). The UV sensor 138 (shown in FIG. 12) provided to the system 100 can also be used to evaluate different weathering chambers for uniformity. The UV sensor can be disposed on the main board 110 as shown in FIG. 8.

Figure 14:
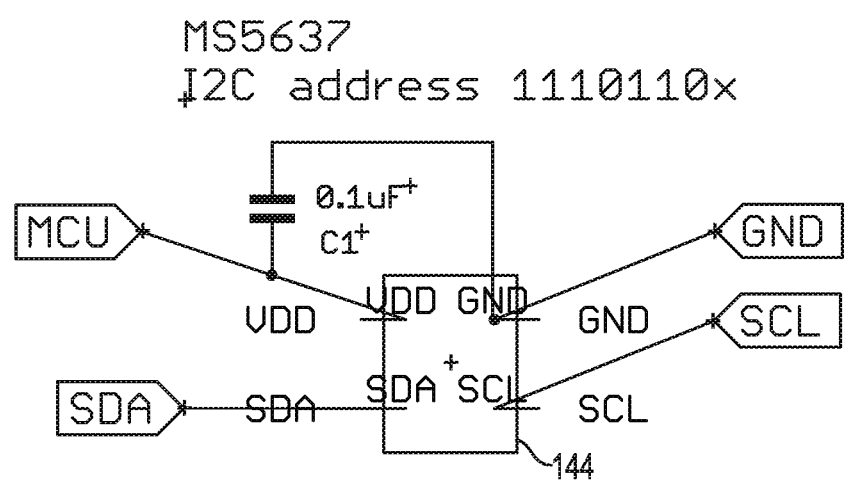
FIG. 14 is an electrical schematic for a pressure sensor according to certain embodiments.

A pressure sensor 144 can be provided. Once a cavity is sealed, the pressure within the cavity is constantly changing due to atmospheric conditions (barometric) as well as thermal expansion and contraction of the structure forming the sealed enclosure. Virtually every structure will have different dimensions, and thus different pressures for a fixed volume of gas introduced into the sealed enclosed space. Knowing the exact pressure inside of the enclosure can aid in design of sealant spacer systems, aid calculations of edge stress and calculations of glass stress. The pressure sensor 144 (shown in FIG. 14) can be disposed on the main board 110 as shown in FIG. 8.

An acoustic sensor 146 can be provided. Precise sound transmission levels can be documented at various frequencies by providing an acoustic sensor to the system. The acoustic sensor 146 can be disposed on the main board 110 as shown in FIG. 8.

An ambient light sensor 148 can be provided. This sensor can be used to monitor external atmospheric conditions such as the amount of daylight that is cast upon the sensor. It can be useful to know for example for a given installation location of an insulating glass unit in a particular location or side of a building, how much daylight is penetrating into the sealed enclosure. The ambient light sensor 148 can be disposed on the main board 110 as shown in FIG. 8.

Any one or a combination of the foregoing sensors can be provided in a sensor system according to certain embodiments of the invention. Additional sensors not discussed herein can also be included without departing from the scope of the invention.

Figure 13:
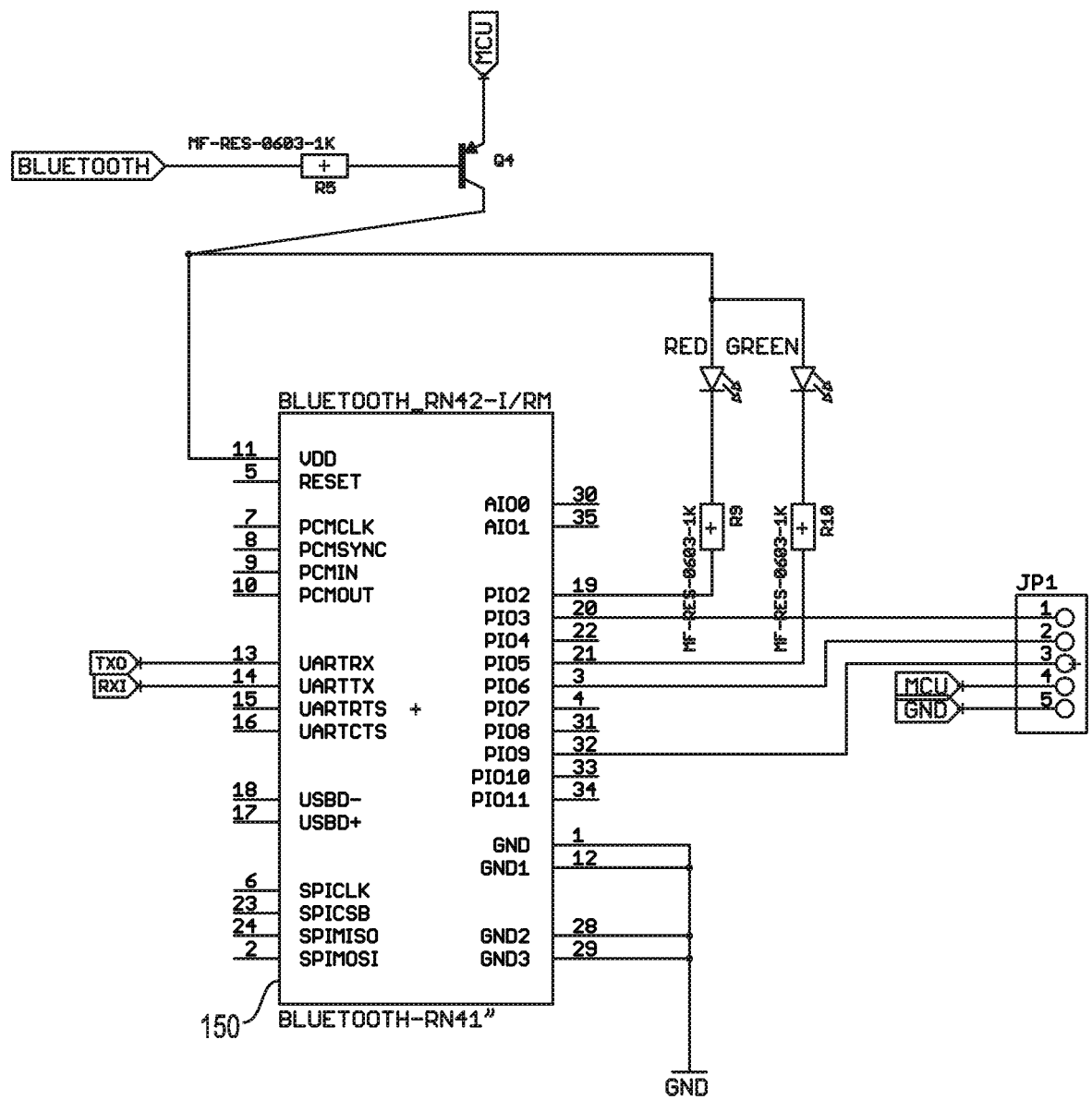
FIG. 13 is an electrical schematic for a Bluetooth communications component according to certain embodiments.

A wireless communication component can be provided. The sensor system 100 includes wireless communication, wireless power and data logging. A Bluetooth chip 150 (shown in FIGS. 8 and 13) can be provided to the system as a means for wireless communication. Other wireless communications means can include infrared (IR), Wi-Fi, Zig-Bee, etc. A combination of two or more wireless systems can also be provided. The Bluetooth chip 150 can be disposed on the main board 110 as shown in FIG. 8. The wireless communications can be two-way. That allows the sensor data to be read as well as new software or firmware to be uploaded to the microcontroller.

Figure 9A:
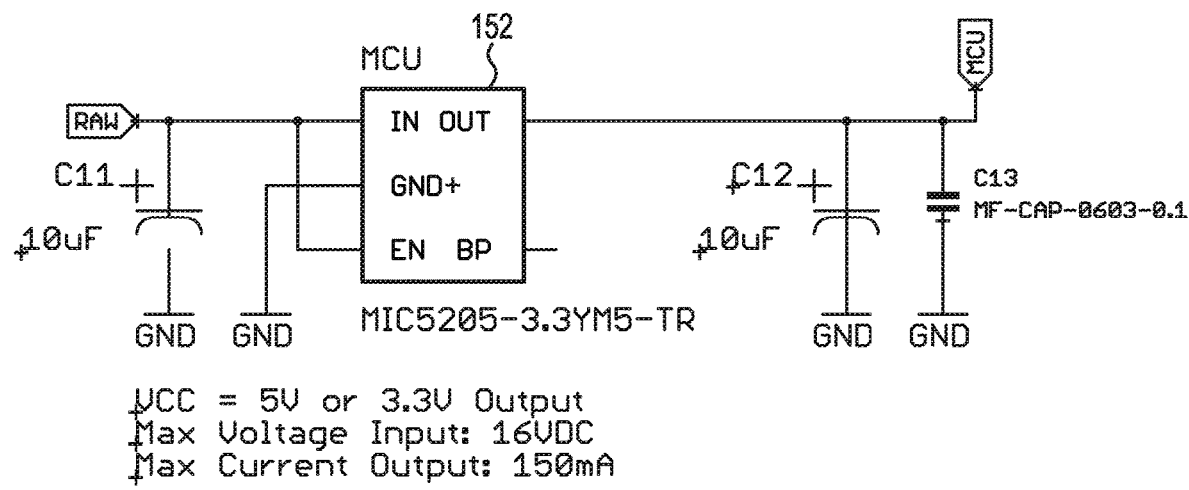
FIG. 9A is a voltage regulator schematic for a controller according to certain embodiments.

Referring to FIG. 9A, the voltage regulator 152 for the main microprocessor (MCU or microcontroller) 136 is shown. The MCU voltage regulator 152 is disposed on the main board 110 as shown in FIG. 8. The main voltage regulator 152 can also be used to power one or more of the sensors such as shown in FIG. 8. In another alternative, the main voltage regulator 152 can be used to power one or more sensors, while the MCU is powered via an integrated voltage regulator.

Figure 9B:
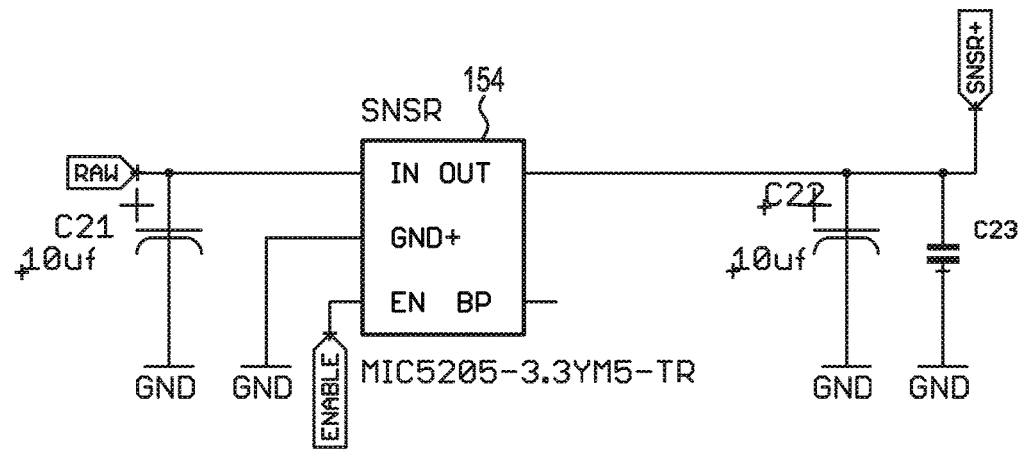
FIG. 9B is a voltage regulator schematic for a sensor according to certain embodiments.

Referring to FIG. 9B, the voltage regulator 154 for the TCD sensor 116 is shown. The sensor voltage regulator 152 is disposed on the main board 110 as shown in FIG. 8.

Figure 10:
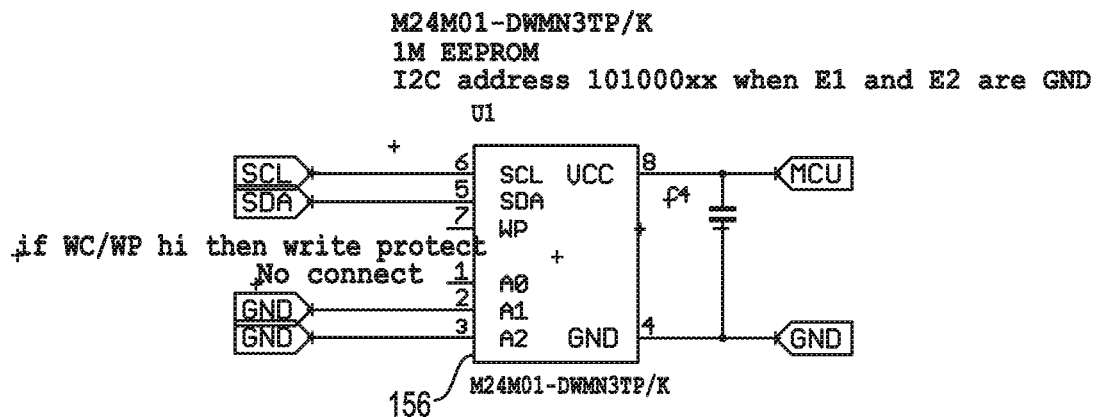
FIG. 10 is an electrical schematic for an EEPROM according to certain embodiments.

Referring to FIG. 10, the physical non-transitory memory component 156 is shown. The memory in this example embodiment is an electrically erasable programmable read-only memory (EEPROM). The memory 156 can be used to log the data recorded by the various sensors. Other memory types can be used in other embodiments. The memory 156 is disposed on the main board 110.

The benefits of the present invention can include any one or more of the following: one can measure the thermal conductivity of a gas in a sealed package, container, or IGU; no altering of the sealant spacer glass bond is needed, so "pure" information on conditions inside the sealed unit can be obtained; accuracy several orders of magnitude higher than present methods can be achieved; inexpensive; reusable; predictive—when coupled with a simple pressure cycle high humidity chamber—fast and accurate comparisons of sealant spacer systems can be made.

In use, the sensor system is placed within the enclosure, such as an insulated glass unit (IGU). The enclosure is subsequently sealed. Additional processes may be performed to the enclosure after insertion of the sensor system, such as evacuation, purging and introduction of gas(es) and desiccant(s) without departing from the scope of the invention. The sensor system described herein can be used in any sealed environment where its benefits may be advantageous.

A computing device, including for example laptops, tablet computers and smart phones, can be used to read the measurements taken by the sensor system. The computing device is wirelessly paired with the sensor system via the wireless communications means discussed herein.

A conventional inductive charger can be employed to power the inductive coil of the sensor system to power the sensor system in situ.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A sensor system for sensing environmental conditions inside of a sealed enclosure, the system comprising:

a microcontroller; and a thermal conductivity sensor for sensing inert gas concentration, which is operably coupled to the microcontroller, the thermal conductivity sensor comprising:

a lamp including a filament that is exposed to the environment inside of the sealed enclosure, wherein the lamp is an incandescent type and the filament is exposed to the environment via an aperture defined in a glass enclosure of the lamp;

a thermal mass, wherein the lamp is disposed within the thermal mass;

a heater coupled to the thermal mass; and a temperature sensor coupled to the thermal mass.

2. The sensor system of claim 1, wherein the thermal mass comprises an aluminum block which defines a cavity where the lamp is located.

3. The sensor system of claim 1, wherein a layer of insulation is provided to the thermal mass.

4. The sensor system of claim 1, wherein the heater comprises a plurality of resistors thermally coupled to the thermal mass.

5. The sensor system of claim 1, further comprising an analog to digital converter, wherein the thermal conductivity sensor is operably coupled to the microcontroller via the analog to digital converter.

6. The sensor system of claim 1, further comprising a relative humidity sensor and a temperature sensor, each operably coupled to the microcontroller.

7. The sensor system of claim 1, further comprising an oxygen sensor operably coupled to the microcontroller.

8. The sensor system of claim 1, further comprising an acoustic sensor operably coupled to the microcontroller.

9. The sensor system of claim 1, further comprising an ambient light sensor operably coupled to the microcontroller.

10. The sensor system of claim 1, further comprising a pressure sensor operably coupled to the microcontroller.

11. The sensor system of claim 1, further comprising an ultraviolet sensor operably coupled to the microcontroller.

12. The sensor system of claim 1, further comprising a non-transitory memory operably coupled to the microcontroller.

13. The sensor system of claim 1, further comprising a wireless communication chip operably coupled to the microcontroller.

14. The sensor system of claim 1, further comprising wireless power source provided to the sensor system.

15. The sensor system of claim 14, wherein wireless power source comprises an inductive coil.

16. An insulated glass unit, comprising:

a front glass plate;

a back glass plate spaced apart from the front glass plate and oriented parallel to the front glass plate;

a frame surrounding a perimeter of the front and back glass plates, which defines an enclosed space;

a sensor system disposed entirely within the enclosed space, the sensor system comprising:

a microcontroller; and a thermal conductivity detector for sensing inert gas concentration, which is operably coupled to the microcontroller, the thermal conductivity sensor comprising:

a lamp including a filament that is exposed to the environment inside of the sealed enclosure, wherein the lamp is an incandescent type and the filament is exposed to the environment via an aperture defined in a glass enclosure of the lamp;

a thermal mass, wherein the lamp is disposed within the thermal mass;

a resistive heater coupled to the thermal mass; and a temperature sensor coupled to the thermal mass.

17. The insulated glass unit of claim 16, wherein the thermal mass comprises an aluminum block which defines a cavity where the lamp is located, and wherein a layer of insulation is provided to the thermal mass.

18. A method of monitoring an environment inside of a sealed container, including an inert gas concentration, the method comprising:

disposing a sensor system completely within the sealed container;

wirelessly powering the sensor system;

forming an aperture in a glass enclosure of an incandescent lamp to expose a filament of the incandescent lamp to the environment inside of the sealed container;

disposing the incandescent lamp at least partially within a thermal mass;

heating the thermal mass to a temperature above a temperature of the environment inside of the sealed container;

forming a first voltage divider circuit that includes the incandescent lamp;

forming a second voltage divider circuit that is a reference voltage divider circuit;

determining a differential voltage utilizing the first and second voltage divider circuits; and determining the inert gas concentration from the differential voltage.

* * * * *